United States Patent [19]

Miichi et al.

[11] Patent Number: 5,446,660
[45] Date of Patent: Aug. 29, 1995

[54] ELECTRONICALLY CONTROLLED POWER STEERING APPARATUS AND METHOD THEREFOR

[75] Inventors: Yoshinori Miichi; Mitsuhiko Harara; Tadao Tanaka, all of Okazaki, Japan

[73] Assignee: Mitsubishi Jidosha Kogyo Kabushiki Kaisha, Tokyo, Japan

[21] Appl. No.: 124,758

[22] Filed: Sep. 22, 1993

[30] Foreign Application Priority Data

Sep. 22, 1992 [JP] Japan .................................. 4-253174

[51] Int. Cl.6 .............................................. B62D 5/00
[52] U.S. Cl. ........................... 364/424.05; 364/424.01; 364/426.04
[58] Field of Search ...................... 364/424.05, 424.01, 364/426.04; 180/79.1, 141; 340/575, 576

[56] References Cited

U.S. PATENT DOCUMENTS

| | | | |
|---|---|---|---|
| 4,540,979 | 9/1985 | Gierger et al. ................. | 340/576 |
| 4,706,072 | 11/1987 | Ikeyama ....................... | 340/576 |
| 4,708,220 | 11/1987 | Noto et al. ................... | 180/142 |
| 4,834,203 | 5/1989 | Takahashi et al. .............. | 180/79.1 |
| 4,858,134 | 8/1989 | Eto et al. .................... | 364/424.05 |
| 4,875,540 | 10/1989 | Oshita et al. ................. | 180/79.1 |
| 4,930,084 | 5/1990 | Hosaka et al. ................. | 364/426.04 |
| 5,018,594 | 5/1991 | Takahashi et al. .............. | 180/140 |
| 5,040,629 | 8/1991 | Matsuoka et al. ............... | 180/79.1 |
| 5,046,572 | 10/1991 | Komatsu ....................... | 180/140 |
| 5,105,899 | 4/1992 | Mori et al. ................... | 364/424.01 |
| 5,138,554 | 8/1992 | Wada .......................... | 364/424.05 |
| 5,162,997 | 11/1992 | Takahashi ..................... | 364/424.05 |
| 5,172,785 | 12/1992 | Takahashi ..................... | 364/424.05 |
| 5,313,389 | 5/1994 | Yasui ......................... | 364/424.05 |

OTHER PUBLICATIONS

Japanese Utility Model Laid–Open No. 60480/1991; Laid Open Jun. 13, 1991; Hiroshi Ueno; "Power Steering Device" with English Translation..

*Primary Examiner*—Kevin J. Teska
*Assistant Examiner*—Stephen J. Walder, Jr.

[57] ABSTRACT

An electronically controlled power steering apparatus for controlling the steering assist amount of a steering mechanism of a vehicle is controlled in accordance with a fatigue condition of a driver of the vehicle. The apparatus includes means for setting an aimed assist amount, and means for detecting a degree of fatigue of a steering operator. The aimed assist amount setting means receives, as an input thereto, a value calculated by the fatigue detecting means and sets the aimed assist amount in accordance with a fuzzy rule so that the steering assist amount may increase as the degree of fatigue steering operator increases.

27 Claims, 8 Drawing Sheets

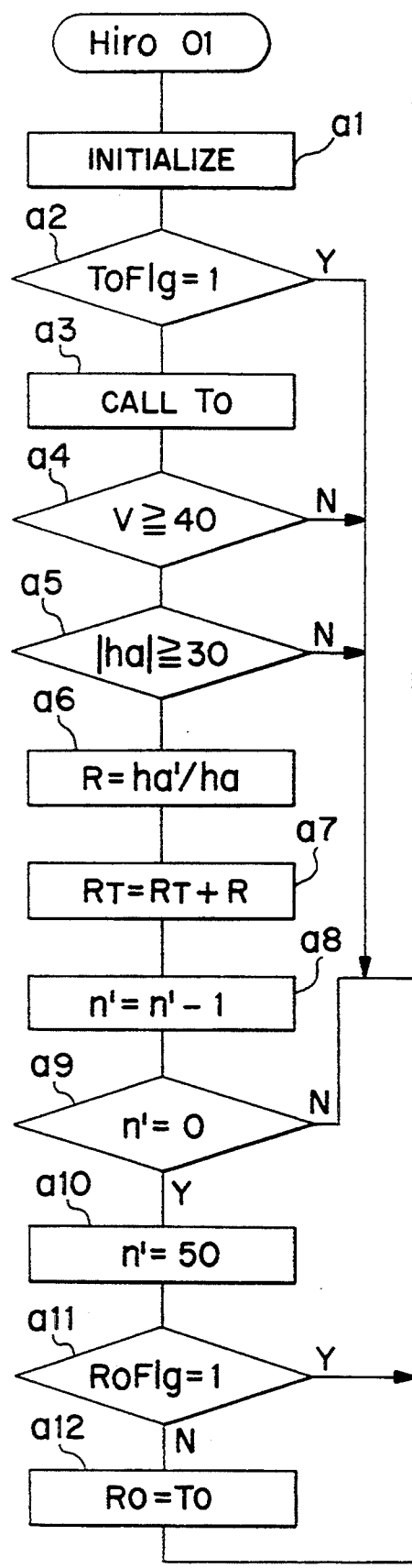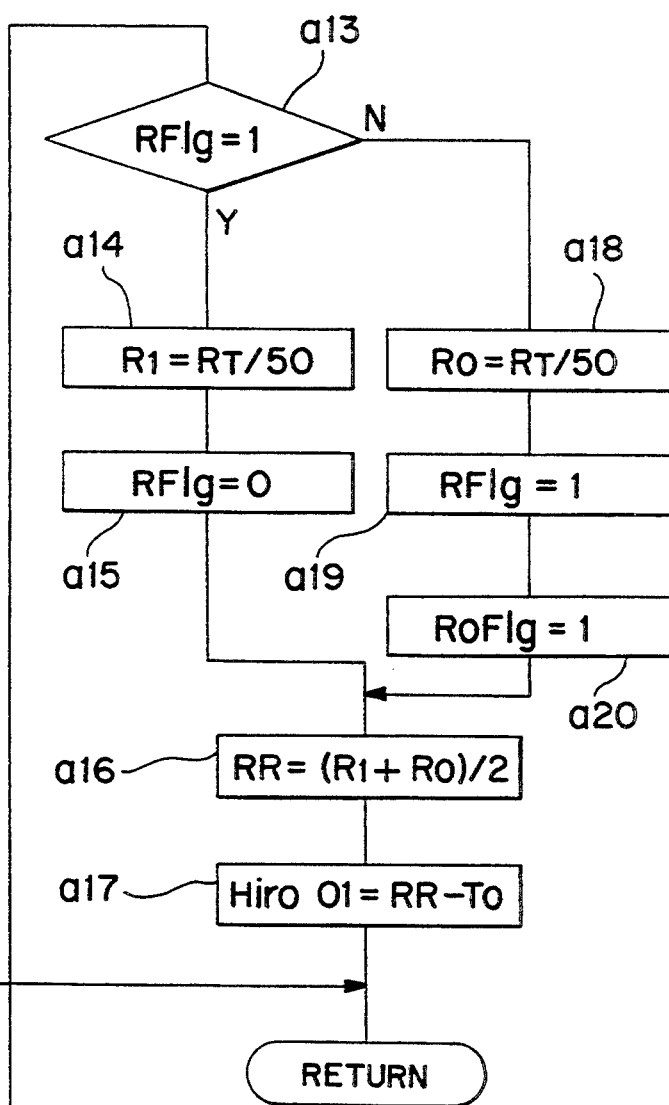
FIG. 7

ELECTRONICALLY CONTROLLED POWER STEERING APPARATUS AND METHOD THEREFOR

BACKGROUND OF THE INVENTION

1. Field of the Invention

This invention relates to an electronically controlled power steering apparatus which controls the steering assist amount of a steering mechanism of a vehicle, and more particularly to an electronically controlled power steering apparatus of the type wherein the aimed assist amount is set in accordance with a fuzzy rule.

2. Description of the Related Art

In recent years, power steering apparatus have varied widely for assisting the force (hereinafter referred to as steering wheel operating force or steering force) for operating a steering wheel. Particularly, hydraulic power steering apparatuses which make use of a hydraulic cylinder mechanism to hydraulically assist the steering wheel operating force are popularly employed as such power steering apparatuses. Also, electrically operated power steering apparatuses wherein the steering wheel operating force is assisted by an electric motor, have been developed.

Such power steering apparatus as described above allow steering of a vehicle, for which high steering wheel operating force is required, such as, for example, a large size vehicle or a vehicle which employs wide tires for wheels for steering operation, to be performed with a low steering wheel operating force, eliminating so-called heavy operation of the steering wheel.

Another consideration is that, when the vehicle speed is low such as upon garaging, generally the steering operation is desired to be performed with a lower steering force. On the other hand, when the vehicle is running at a high speed, if the steering operation is very light, then running of the vehicle becomes unstable, and accordingly, the steering operation is desired to be rather heavy. Thus, a vehicle speed responsive power steering apparatus has been developed wherein the steering wheel operation is controlled in response to the speed of the vehicle such that, when the vehicle runs at a low speed, the steering assist amount is set to a comparatively high value so as to make the steering wheel operation lighter, but when the vehicle runs at a medium or high speed, the steering assist amount is set to a comparatively low value to make the steering wheel operation heavier.

In one of such vehicle speed responsive power steering apparatus, a vehicle speed sensor is provided on the vehicle while a valve for adjusting hydraulic oil to be supplied to a power cylinder is provided in a hydraulic system of the hydraulic power steering apparatus, and operation of the valve is controlled in response to a vehicle speed detected by the vehicle speed sensor to adjust the steering assist amount. The vehicle speed responsive power steering apparatus of the type just mentioned is called an electronically controlled power steering apparatus.

In the following, construction of an exemplary conventional electronically controlled power steering apparatus will be described with reference to FIGS. 9 to 11.

Referring to FIGS. 9 to 11, an input shaft 11 is fitted for rotation in a casing 25 by means of bearings and is connected to receive steering force from a steering wheel not shown. A pinion 12 is mounted for relative rotation at a lower end of the input shaft 11 with a bush or a like element not shown interposed therebetween.

A torsion bar 15 is located in the hollow inside of the input shaft 11. The torsion bar 15 is coupled at an upper end thereof for integral rotation to the input shaft 11 by way of a pin or a like element while it is not restrained at a lower end thereof by the input shaft 11.

The pinion 12 is held in serration coupling engagement with the lower end of the torsion bar 15 so that the steering force inputted to the input shaft 11 may be transmitted to the pinion 12 by way of the torsion bar 15. The pinion 12 is held in meshing engagement with a rack 13 so that the steering force may be transmitted to the rack 13 by way of the pinion 12 to move the rack 13 in its axial direction (in a direction perpendicular to the plane of FIG. 9) to steer wheels of the vehicle (not shown).

A power steering hydraulic cylinder 14 includes a cylinder 14A mounted on a member on the body of the vehicle, and a piston 14B provided intermediately of the rack 13 for movement in an axial direction in the cylinder section 14A together with the rack 13. The inside of the cylinder 14A is partitioned leftwardly and rightwardly by the piston 14B into a pair of oil chambers 14C and 14D.

A rotary valve 16 is provided for driving the hydraulic cylinder 14. Operating oil is supplied into or discharged from the left or right oil chamber 14C or 14D of the hydraulic cylinder 14 by opening or closing motion of the rotary valve 16 to provide steering assist force to the rack 13.

The rotary valve 16 is interposed between the input shaft 11 side and the pinion 12 side and is opened or closed in response to a difference in phase between the input shaft 11 and the pinion 12. In particular, when steering force is inputted to the input shaft 11, the input shaft 11 is rigid and presents little distortion, but the torsion bar 15 transmits the steering force to the pinion 12 while presenting some distortion, and consequently, the pinion 12 presents a difference in phase (angular position) to the steering side as compared to the input shaft 11. The rotary valve 16 is opened or closed so as to produce required steering assist force in the steering direction in response to the difference in phase.

A plurality of reactive force plungers 17 for providing, upon steering, steering reactive force to increase the steering force (that is, steering reaction) are provided on an outer periphery of a lower portion of the input shaft 11 such that they surround the outer periphery of the input shaft as seen in FIG. 11. The reactive force plungers 17 receive, at chambers 17A at back portions thereof, hydraulic oil supplied thereto under the control of a hydraulic pressure control valve 18 to restrain the input shaft 11 to provide steering reactive force in response to the hydraulic pressure. The chambers 17A communicating with an oil reservoir 24 by way of respective return orifices 22.

The hydraulic pressure control valve 18 is provided next to and extends in parallel to the input shaft 11 in the casing 25 as shown in FIG. 10 and includes a plunger 18A fitted for upward and downward sliding movement in the casing 25, a solenoid 19 for exerting upward axial force to the plunger 18A, and a spring 20 for normally biasing the plunger 18A downwardly.

The plunger 18A has a pair of oil passages and 18C communicating with the oil reservoir 24, an annular oil passage 18D for communicating with the oil pump 23, another annular oil passage 18F for communicoating with the chambers 17A of the reactive force plungers 17, and an oil passage 18F for communicating the annular oil passages 18D and 1BE with each other. Operating oil of a high pressure from the oil pump 23 is supplied from the annular oil passage 18D into the chambers 17A of the reactive force plungers 17 by way of the oil passage 18F and the annular oil passage 18E.

Upon steering, for example, while the vehicle stops or is running at a low speed, maximum current is supplied to the solenoid 19. Consequently, the plunger 18A is moved upwardly to its highest position in which the annular oil passage 18D is not communicated with the oil pump 23 and supply of oil to the chambers 17A of the reactive force plungers 17 is stopped. Consequently, the reactive plungers 17 do not restrain the input shaft 11, and steering can be performed with light force.

On the other hand, for example, while the vehicle is running at a medium or high speed, the current supply to the solenoid 19 is decreased in response to an increase of the vehicle speed. Consequently, when the steering wheel is at its neutral position, the axial force of the plunger 18A decreases as the current decreases, and as the axial force decreases, the plunger 18A is moved down so that the annular oil passage 18D is communicated with the oil pump 23 to allow oil to be supplied to the chambers 17A of the reactive force plungers 17.

In this condition, tile reactive force plungers 17 restrain the input shaft 11, and consequently, the steering wheel is held at its neutral position. Then, if the steering wheel is moved slightly from the neutral position, then the output of the oil pump 23 tries to rise. In this instance, the discharging pressure of the oil pump 23 acts upon the chambers 17A of the reactive force plungers 17 almost without being controlled by the hydraulic pressure control valve 18. Accordingly, in the proximity of the neutral position of the steering wheel, the steering force is increased and a sufficient response of the steering wheel at the neutral position is obtained, resulting in a feeling of stability of the steering wheel in the neutral position.

Upon steering while the vehicle is running at a medium or high speed, the output of the oil pump 23 rises, within an ordinary steering range, to increase the steering assist amount in response to steering of the steering wheel, that is, in response to an increase of the steering force. Meanwhile, the discharging pressure of the oil pump 23 acts upon the chambers of the reactive force plungers 17 while being controlled by the hydraulic pressure control valve 18. Accordingly, the reactive force plungers 17 act to restrain the input shaft 11 to increase the steering response (steering force).

AS a result, upon steering when the vehicle runs at a medium or high speed, the steering force required is increased by an amount corresponding to the action of the reactive force plungers 17 as compared with the steering force required when the vehicle stops or is running at a low speed. In short, the steering response is increased and a stable steering feeling is obtained at medium or high speed. Particularly, when the current supply to the solenoid 19 is decreased in response to an increase of the vehicle speed, as the speed of the vehicle increases, the steering assist amount decreases and the steering force (steering response) increases, and consequently, a steering feeling of higher stability can be obtained.

The steering assist characteristic can be controlled by adjusting the current to be supplied to the solenoid 19 in this manner. As seen from FIG. 11, the current to be supplied to the solenoid 19 a control unit (control means) 30 in response to, in addition to vehicle speed information from a vehicle speed sensor 31, for example, mode setting information from an EPS (electronically controlled power steering) mode changeover switch 32 and an engine rotation signal from an engine speed sensor 33 or a like element to control the solenoid 19.

In particular, the EPS mode changeover switch 32 can selectively set a normal mode and a sport mode in which the steering force is increased at a lower speed than in the normal mode. When one of the modes is set, the control unit 30 controls the steering assist characteristic of the power steering mechanism in accordance with the set mode. For example, when the sport mode is set, the current to be supplied to the solenoid 19 is adjusted in response to vehicle speed information so as to present such an assist characteristic that the assist amount decreases gradually as the vehicle speed increases from a medium speed range of the speed $V_1$ as seen from FIG. 12. On the other hand, when the normal mode is set, the current to be supplied to the solenoid 19 is adjusted in response to vehicle speed information so as to present such an assist characteristic that the assist amount decreases gradually as the speed vehicle increases from a little higher speed range of the speed $V_2$ ($>V_1$).

Further, when trouble in a detection circuit is detected from vehicle speed information, an engine rotation signal or the like, the solenoid 19 is switched off to effect fail-safe control.

A further consideration is that, when a driver (steering operator) becomes fatigued, the driver feels tired in operation of the steering wheel and feels like operating the steering wheel with lighter-force, However, with the conventional electronically operated power steering apparatus, since control of the steering assist amount is performed merely in response to the vehicle speed as described above, the steering assist force is set irrespective of the fatigue condition of the driver.

Thus, a power steering apparatus wherein the steering assist amount is varied in response to the fatigue condition of a driver has been proposed and is disclosed in Japanese Utility Model Laid-Open Application No. Heisei 3-60480. In the power steering apparatus, the driving time of the vehicle is detected, and when the driving time is excessively long, it is determined that the driver becomes fatigued, and the steering assist amount is increased.

With that power steering apparatus, however, since the steering assist amount is increased as the driving time increases, also when the steering angle is particularly large and a medium or high lateral acceleration acts upon the vehicle as at a curved road on a mountain or the like, the steering force is generally light. Consequently, the response feeling in operation of the steering wheel becomes insufficient, and insufficient steering linearity or loss or absence of steering information is invited, resulting in the problem that the controllability or the tracing performance of the vehicle is degraded.

Further, when the driver takes a rest while the engine is operating, although the driver has recovered from the fatigue by the rest, the steering force remains light and the, driver may feel uncertain due to insufficient feeling or response in steering.

In short, since the steering assist amount is varied irrespective of a variation of the actual fatigue condition of the driver as the driving time passes, the power steering apparatus cannot accomodate the actual fatigue condition of the driver accurately to obtain an optimum steering assist amount.

SUMMARY OF THE INVENTION

It is an object of the present invention to provide an electronically controlled power steering apparatus wherein the steering assist amount is adjusted in accordance with a fatigue condition of a driver to obtain an optimum steering characteristic eliminating the problems-described above.

In order to attain the object described above, according to the present invention, there is provided an electronically controlled power steering apparatus which comprises aimed assist amount setting means for setting an aimed assist amount and controlling a steering assist amount of a vehicle in response to the aimed assist amount set by the aimed assist amount setting means. There is further provided fatigue determination value calculation means for calculating a determination value of the degree of fatigue of a steering operator. The aimed assist amount setting means receives, as an input thereto, the determination value of the degree of fatigue calculated by the fatigue determination value calculation means and sets the aimed assist amount using the determination value of the degree of fatigue.

With the electronically controlled power steering apparatus, when an aimed assist amount is to be set, since the determination value of the degree of fatigue calculated by the fatigue determination value calculation means is used as an input to the aimed assist amount setting means, the aimed assist amount is thus set according to the degree of fatigue of the steering operator (driver).

As a preferred form of the present invention, the electronically controlled power steering apparatus further comprises steering angle detection means for detecting a steering angle ha, the determination value of the degree of fatigue by the fatigue determination value calculation means being set to a value based on a hysteresis of a steering angular velocity ha' at the steering angle ha detected by the steering angle detection means. Particularly, the determination value of the degree of fatigue is calculated from a reference value $T_0$ calculated by averaging values $R_0$ of the steering angular velocity ha' at the steering angle ha in a predetermined number n of times of steering operations at an initial stage of driving of the vehicle and fatigue data RR calculated By averaging an addition value $R_1$ of values R of the steering angular velocity ha' at the steering angle ha in the predetermined number n of times of steering operations involved in the lapse of the driving time and a preceding addition value $R_0$. Consequently, the degree of fatigue of the steering operator can be determined with certainty, and the aimed assist amount can be set to an optimum steering characteristic in accordance with the degree of fatigue of the steering operator.

As another preferred form of the present invention, the reference value $T_0$ is calculated each time an ignition switch of the vehicle is switched from an off state to an on state. Consequently, when the steering operator takes a rest with the engine of the vehicle stopped and recovers from the fatigue, the aimed assist amount can be set with certainty in accordance with the degree of fatigue of the steering operator at that time.

As a further preferred form of the present invention, the electronically controlled power steering apparatus further comprises vehicle speed detection. means for detecting a speed of the vehicle, the reference value $T_0$ being calculated only when the vehicle speed is equal to or higher than a predetermined value and an absolute steering angle is equal to or larger than a predetermined value, by sampling values $R_0$ of the steering angular velocity ha' at the steering angle ha' in the predetermined number n of times of steering operations. Consequently, the fatigued condition of the steering operator, including the driving condition in which the steering operator becomes fatigued, is taken into considerations and can be calculated with certainty. Further, also the fatigue data RR is calculated, only when the vehicle speed is equal to or higher than a predetermined value and an absolute steering angle is equal to or larger than a predetermined value, similarly by sampling values R of the steering angular velocity ha' at the steering angle ha in the predetermined number n of times of steering operations, so that the degree of fatigue of the steering operator can be calculated with a higher degree of certainty.

As a still further preferred form of the present invention, the aimed assist amount setting means sets the aimed assist amount using a membership function for evaluation of the determination value of the degree of fatigue so that the aimed assist amount may be increased or decreased in response to the magnitude of the determination value of the degree of fatigue. Thus, fine control wherein the degree of fatigue of the steering operator is taken into consideration can be achieved, and an optimum steering characteristic for the steering operator can be obtained.

As a yet further preferred form of the present invention, the aimed assist amount setting means sets the aimed assist amount using a membership function with which the aimed assist amount is set from an adaptation calculated for the determination value of the degree of fatigue, so that the adaptation of the determination value of the degree of fatigue is set to 0 when the determination value of the degree of fatigue is lower than a predetermined value. Consequently, when the steering operator is not fatigued, the aimed assist amount can be prevented from increasing.

As a yet further preferred form of the present invention, the adaptation of the determination value of the degree of fatigue is set so that, in a region in which the determination value of the degree of fatigue is equal to or higher than a first predetermined value, the aimed assist amount is increased as the adaptation of the determination value increases, but in another region in which the determination value of the degree of fatigue is equal to or higher than a second predetermined value which is higher than the first predetermined value, the adaptation of the determination value of the degree of fatigue is fixed irrespective of an increase of the determination value of the degree of fatigue. Consequently, it can be prevented that the steering force generally becomes excessively light to such a degree that the response feeling to the operation of the steering wheel is insufficient, thus avoiding deficiency of the steering linearity or loss or absence of steering information such as would result in degradation of the controllability or the tracing performance of the vehicle.

BRIEF DESCRIPTION OF THE DRAWINGS

FIGS. 7 and 8 are flow charts illustrating details of control of the electronically controlled steering apparatus of the fuzzy control type of FIG. 1;

FIG. 12 is a diagram illustrating the characteristic of the assist amount of the conventional electronically controlled power steering apparatus of

DETAILED DESCRIPTION OF THE PREFERRED EMBODIMENT

An electronically controlled power steering apparatus of the fuzzy control type according to a preferred embodiment of the present invention will be described with reference to the drawings.

Figure 9:
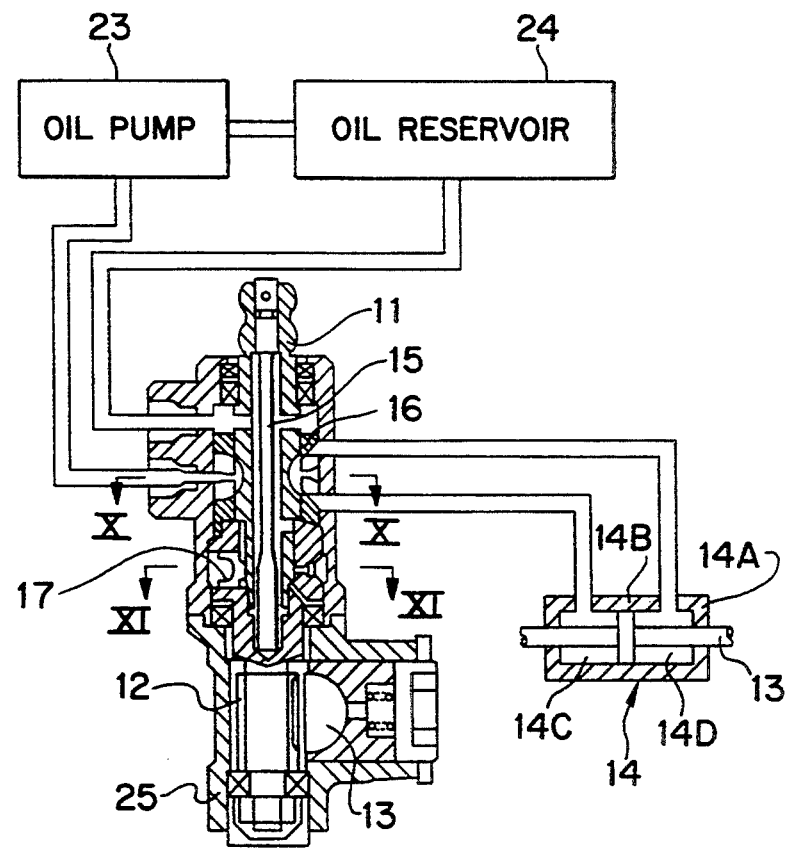
FIG. 9 is a sectional view showing an input shaft, a pinion shaft and associated elements of a conventional electronically controlled power steering apparatus together with a power steering hydraulic cylinder.

The electronically controlled power steering apparatus of the fuzzy control type has a mechanical section (hardware construction) substantially similar to that of the conventional electronically controlled power steering apparatus described hereinabove with reference to FIGS. 9 to 11, and accordingly, the mechanical section will be described briefly below.

Figure 1:
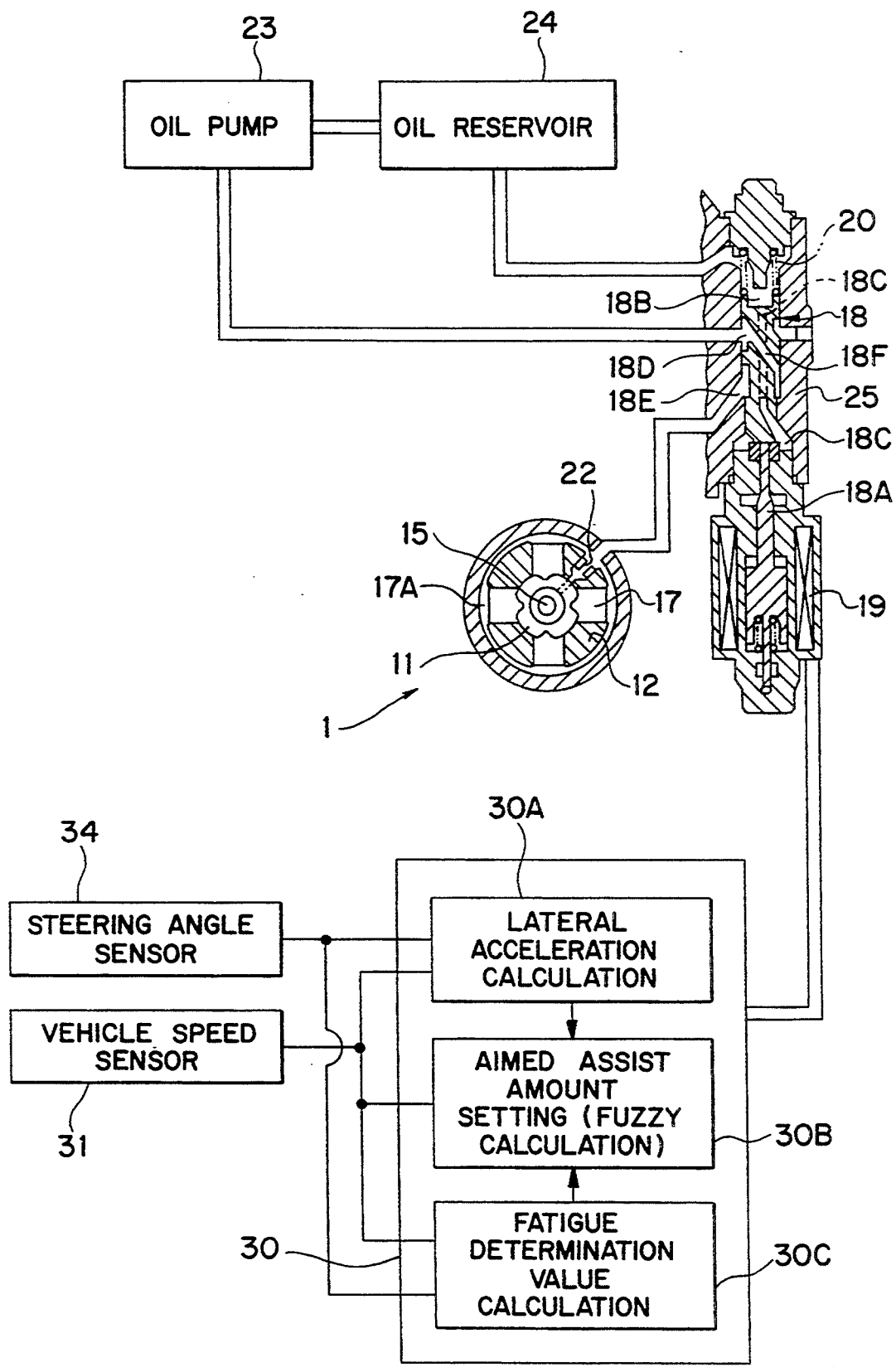
FIG. 1 is a schematic diagrammatic view of part of an electronically controlled power steering apparatus of the fuzzy control type showing a preferred embodiment of the present invention.
Figure 10:
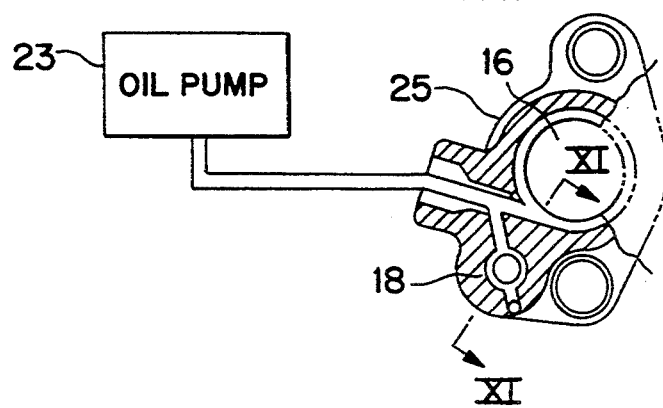
FIG. 10 is a transverse sectional view taken along line X—X of FIG. 9 showing the input shaft and associated elements of the conventional electronically controlled power steering apparatus of FIG. 9.
Figure 11:
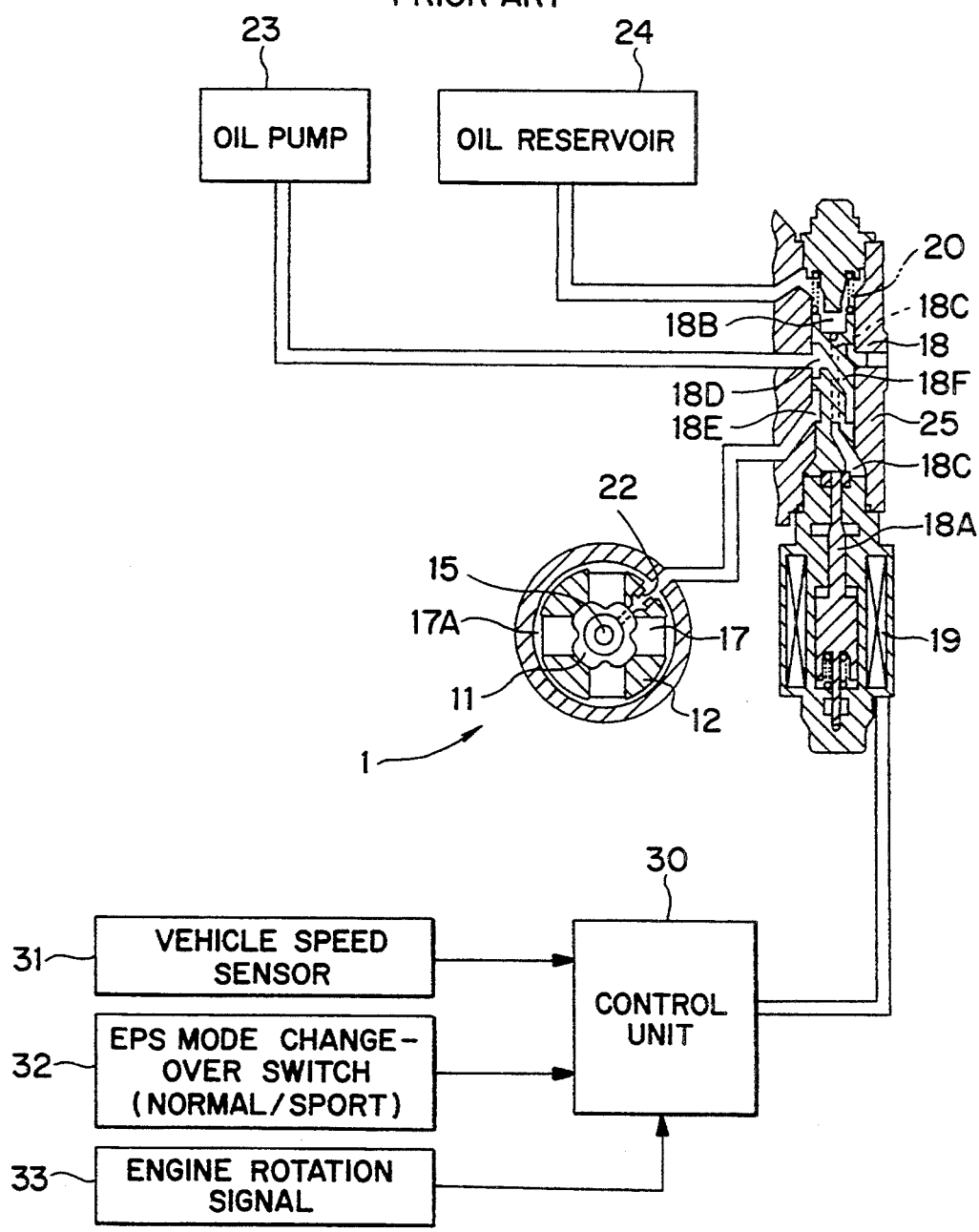
FIG. 11 is a diagrammatic sectional view taken along line XI—XI in FIG. 10 showing a hydraulic control valve provided alongside the input shaft of the conventional electronically controlled power steering apparatus of FIG. 9 while a reactive force plunger is shown in sectional view taken along line XI—XI in FIG. 9.
Figure 12:
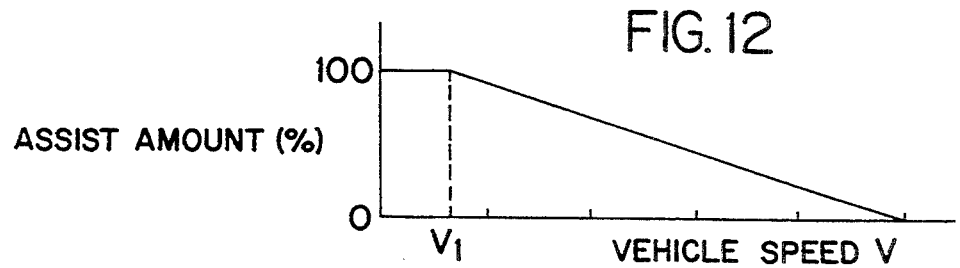

In particular, referring to FIGS. 1, 10 and 11, in the inside of an input shaft 11, a torsion bar 15 is coupled at an upper end thereof for integral rotation with the input shaft 11 while it is not restrained at a lower end thereof from the input shaft 11.

A pinion 12 is held in serration coupling engagement with the lower end of the torsion bar 15 so that the steering force inputted to the input shaft 11 may be transmitted to the pinion 12 by way of the torsion bar 15. The pinion 12 is held in meshing engagement with a rack 13 so that the steering force may be transmitted to the rack 13 by way of the pinion 12.to move the rack 13 in its axial direction to effect steering of wheels.

A hydraulic cylinder 14 is provided on the rack 13 and includes a cylinder 14A installed on a member on the body Of the vehicle and a piston 14B located intermediately of the rack 13 for movement in an axial direction in the cylinder 14A together with the rack 13. The hollow inside of the cylinder 14A is partitioned by the piston 14B into a pair of oil chambers 14C and 14D.

A rotary valve 16 is interposed between the input shaft 11 and the pinion 12. The rotary valve 16 is opened or closed in response to a difference in phase between the input shaft 11 and the pinion 12, and as the rotary valve 16 is opened or closed, operating oil is supplied into or discharged from the left or right oil chamber 14C or 14D of the hydraulic cylinder 14 so that steering assist force is provided to the rack 13.

A plurality of reactive force plungers 17 for exerting, upon steering, steering reactive force to increase the steering force (that is, steering response) are provided on an outer periphery of a lower portion of the input shaft 11 such that they surround the outer periphery of the input shaft 11. The reactive force plungers 17 receive, at chambers 17A at rear portions thereof, oil under pressure supplied under the control of a hydraulic pressure control valve 18 to restrain the input shaft 11 in response to the hydraulic pressure to exert steering reactive force. The chambers 17A are communicated with an oil reservoir 24 by way of respective return orifices 22.

The hydraulic pressure control valve 18 is provided next to and extends in parallel to the input shaft 11 in the easing 25. The hydraulic pressure control valve 18 includes a plunger 18A fitted for upward and downward sliding movement in the casing 25, a solenoid 19 for exerting upward axial force to the plunger 18A, and a spring 20 for normally biasing the plunger 18A downwardly.

The plunger 18A has a pair of oil passages 18B and 18C communicated with the oil reservoir 24, an annular oil passage 18D for communicating with an oil pump 23, another annular oil passage 18E for communicating with the chambers 17A of the reactive force plungers 17, and an oil passage 18F for communicating the annular oil passages 18D and 1BE with each other, In short, operating oil of a high pressure from the oil pump 23 is supplied from the annular oil passage 18D to the chambers 17A of the reactive force plungers 17 by way of the oil passage 17P and the annular oil passage 18E.

In the hydraulic pressure control valve 18 the construction described above, the amount of current to be supplied to the solenoid 19 is set by way of a control unit (control means) 30 in response to vehicle speed information from a vehicle speed sensor 31, steering angle information from a steering angle sensor 34 and some other information to control the solenoid 19 as seen from FIG. 1.

In particular, the control unit 30 includes a lateral acceleration calculation section 30A, fatigue determination value calculation means 30C for calculating a determination value of a degree of fatigue, and aimed assist amount setting means (fuzzy calculation section) 30B for setting an aimed assist amount by fuzzy calculation. In the control unit 30, the lateral acceleration calculation section 30A calculates a lateral acceleration $G_Y$ acting upon the vehicle from a vehicle speed V and a steering angle ha, and then the fatigue determination value calculation means 30C calculates a fatigue determination value based on the hysteresis of the steering angular velocity with respect to steering. Then, the fuzzy control section 30B executes fuzzy calculation using the lateral acceleration $G_Y$ and the fatigue determination value.

Figure 2:
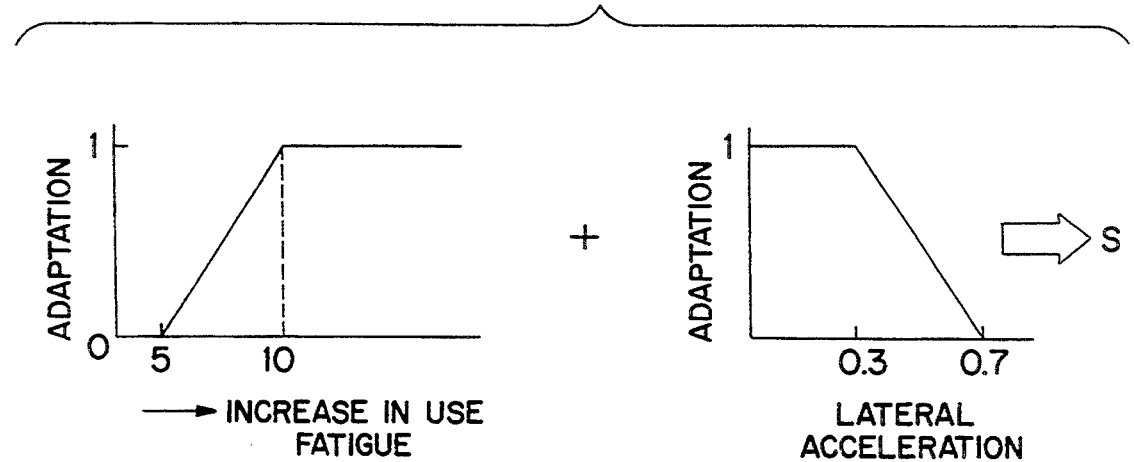
FIG. 2 is a diagram illustrating examples of membership function used for fuzzy control of the electronically controlled power steering apparatus of the fuzzy control type of FIG. 1.

In particular, in the fuzzy calculation section 30B, adaptations or goodnesses of fit are calculated from such a membership function with which an adaptation or goodness of fit (grade) is calculated from the degree of fatigue of the driver (steering operator) and another membership function with which an adaptation or goodness of fit is calculated from the lateral acceleration value $G_Y$ as shown in FIG. 2. Then, from the adaptations, a control amount (that is, an amount by which the assist amount is to be reduced) is determined using .the method of elastic center as seen from FIG. 3, in which a trapezoidal set is shown, to control the amount of current to be supplied to the solenoid 19. Thereby, assist amount control (fatigue countermeasure control) when the driver becomes fatigued is performed.

Here, the membership functions illustrated in FIG. 2 will be described. With regard to the fatigue determination value, when it is equal to or higher than a first predetermined value (here, 5 (deg/s/deg)), the adaptation increases in response to an increase of the fatigue determination value. Then, when the fatigue determination value is equal to or higher than another predetermined value (here, 10 (deg/s/deg)), the adaptation maintains its maximum value 1. Meanwhile, as regards the lateral acceleration value $G_Y$, when it is lower than a first predetermined value (here, 0.3 G), the adaptation maintains its maximum value 1, but when the lateral acceleration value $G_Y$ is equal to or higher than the first predetermined value (here, 0.3 G), the adaptation decreases in response to an increase of the lateral acceleration value $G_Y$. Further, when the lateral acceleration value $G_Y$ is equal to or higher another predetermined value (here, 0.7 G), the adaptation maintaind its minimum value 0.

The fatigue determination value calculation means 30C calculates, for a suitable number of steering operations at an initial stage of driving, an average value (reference value) $T_0$ of values $R_0$ (=ha'/ha) of the steering angular velocity ha' (—dha/dt) at the steering angle ha. Subsequently, the fatigue determination value calculation means 30C adds, always for a suitable number of the latest steering operations, values R (=ha'/ha) of the steering angular velocity ha' (=dha/dt) at the steering angle ha, and averages the thus obtained addition value $R_1$ with a preceding addition value $R_0$ to calculate fatigue data RR(=($R_1$+$R_0$)/2). Then, the fatigue determination value calculation means 30C determines a difference Hiro 01 (=RR—$T_0$) between the fatigue data RR and the reference value $T_0$ as a fatigue determination value.

The process has been developed taking notice of the fact that, as fatigue increases, the steering operation gets rough, and is based on the idea that it is effective for a determination of fatigue to determine, based on the reference value $T_0$ calculated when the driver is not fatigued, the difference between the fatigue data RR and the reference value $T_0$ as a fatigue determination value.

Figure 3:
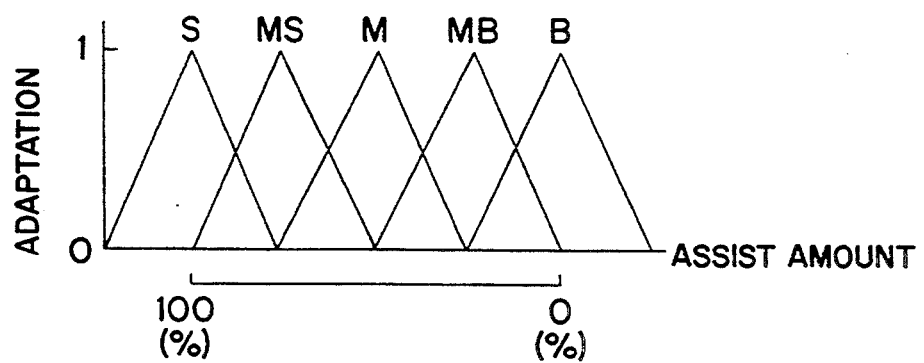
FIG. 3 is a diagram illustrating an example of trapezoidal set with which a power steering assist amount is calculated from an adaptation for use for fuzzy control of the electronically controlled steering apparatus of the fuzzy control type of FIG. 1.

Meanwhile, evaluation of the assist decreasing control amount is divided into five stages of S (small), MS (medium small), M (medium), MB (medium big) and B (big) here as shown in FIG. 3. It is to be noted that the assist amount is set to 100% with the evaluation S, but is set to 0% with the evaluation B.

As regards the adaptation of the degree of fatigue and the adaptation of the degree of the lateral acceleration, the aimed assist amount is set to S (small) so that the steering assist amount may be large. Here, a relatively small adaptation Of the degree of fatigue and a relatively small adaptation of the lateral acceleration is assumed.

It is to be noted that an aimed value of the assist decreasing control amount is determined with regard to the degree of fatigue and the lateral acceleration. That is, an aimed assist amount, is actually composed with another aimed assist amount determined from different input conditions using the method of elastic center or some other method to determine a final aimed assist amount, and accordingly, the adaptation of the degree of fatigue and the adaptation of the lateral acceleration act as weighting factors in the evaluation S. Here, the different input conditions mentioned above include a vehicle speed, a lateral acceleration, a steering angle and so forth, and the selected adaptation is composed with an aimed assist amount which is determined from at least one of the detection values of the input conditions to set a final aimed assist amount.

Figure 6:
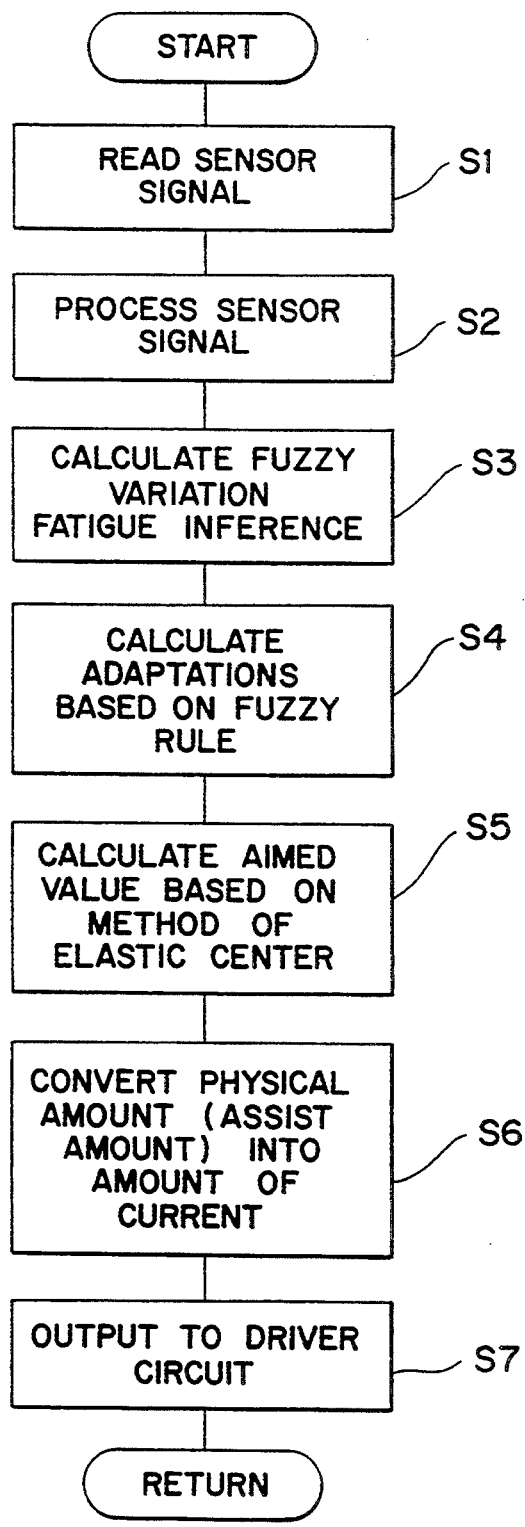
FIG. 6 is a flow chart illustrating generally control of the electronically controlled steering apparatus of the fuzzy control type of FIG. 1.

Since the electronically controlled power steering apparatus of the fuzzy control type according to the embodiment of the present invention is constructed in such a manner as described above, electronic control of power steering is executed, for example, in such a manner as illustrated in FIG. 6., Referring to FIG. 6, sensor signals from the vehicle speed sensor 31 and the steering angle sensor.34 are first read in step S1, and the sensor signals are inputted to the control unit 30, in which they are subsequently converted from analog signals into digital signals (step S2).

Then, a fuzzy variable is calculated. In particular, the lateral acceleration calculation 30A calculates a lateral acceleration $G_Y$ acting upon the vehicle from a vehicle speed V and a steering angle and then the fatigue determination value calculation means 30C calculates a fatigue determination value Hiro01 from the steering angle ha and a steering angular velocity ha' (step S3). Details of such calculation of a fatigue determination value will be hereinafter described.

Then, the fuzzy calculation section 30B calculates an adaptation regarding the fatigue determination value and another adaptation regarding the lateral acceleration $G_Y$ using such membership functions as illustrated in FIG. 2 (step S4).

Then, from the adaptations, an aimed assist amount is determined using the method of elastic center (step S5). Then, the aimed assist amount is converted into a corresponding current amount to be supplied to the solenoid 19 (step 6) and outputted by way of a driver circuit to the solenoid 19 of the hydraulic pressure control valve 18 (step S7).

Calculation of the fatigue determination value mentioned above will be described. First, a steering characteristic when the driver is not in fatigue, that is, a value (reference value) $T_0$ is calculated by averaging, over a required number of times at an initial stage of driving of the vehicle, values $R_0$ (=ha'/ha) of the steering angular velocity ha' (=dha/dt) at the steering angle ha.

Such calculation is performed only once at an initial stage of driving by sampling a required number of times (for example, 50 times) immediately after starting of the engine. In particular, although the calculation section starts its operation after an ignition switch of the vehicle is switched from an off state to an on state, once a reference value $T_0$ is calculated, calculation of such reference value $T_0$ is not performed any more while the on-state of the ignition switch is maintained.

Figure 8:
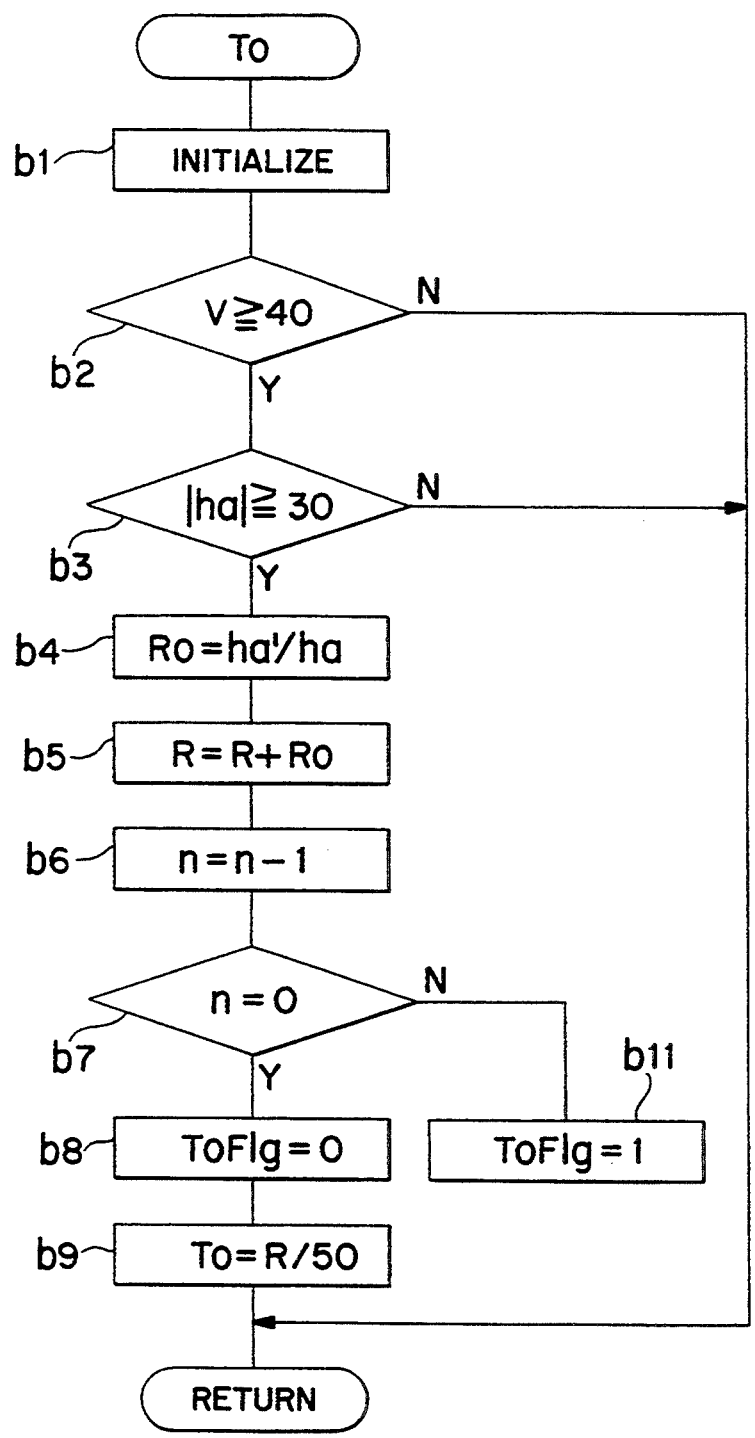

The calculation processing of the reference value $T_0$ proceeds, for example, in such a manner as illustrated in the flow chart of a subroutine for calculation of $T_0$ of FIG. 8. Referring to FIG. 8, the value R is initially set to 0 and the value n is initially set to 50 (step b1).

Then, it is determined whether or not the vehicle speed V is equal to or higher than a predetermined value (for example, 40 km/h) (step b2), and then it is determined whether or not the magnitude |ha| of the steering angle is equal to or larger than a predetermined value (for example, 30 deg) (step b3).

Either when the vehicle speed V is not equal to or higher than the corresponding predetermined value or when the magnitude |ha| of the steering angle is not equal to or larger than the corresponding predetermined value, sampling is not performed, but when the vehicle speed V is equal to or higher than the corresponding predetermined value and the magnitude |ha| of the steering angle is equal to or larger than the corresponding predetermined value, the control sequence advances to step b4, at which a value $R_0$ (=ha'/ha) of the steering angular velocity ha' (=dha/dt) at the steering angle ha is calculated.

Then at step b5, the present value $R_0$ is added to another value R of the steering angular velocity ha' with respect to the steering angle ha, which has been calculated and stored in the last control cycle to obtain a new value R. Further at step b6 the count value n is decremented by one.

Subsequently at step b7, it is determined whether or not the count value n is equal to 0, and if the count value n is not equal to 0, that is, if 50 data samples for the value $R_0$ (=ha'/ha) are not cumulatively added, the control sequence advances to step b11, at which the flag $T_0$Flg is set to 1, whereafter the control sequence returns to Step S1 (FIG. 6).

On the other hand, when the count value n is equal to 0 at step b7, that is, when 50 data samples for the value $R_0$ (=ha'/ha) are added, the control sequence now advances from step b7 to step b8, at which the flag $T_0$Flg is set to 0, and then to step b9, at which the value a obtained by addition of the 50 data samples is divided by 50 to calculate an average value (that is, reference value for fatigue determination) $T_0$.

It is to be noted that the flag $T_0$Flg is set to 1 during sampling for calculation of the reference value $T_0$ but is reset to 0 after the calculation is completed.

Calculation of the fatigue determination value Hiro01 is performed, using the reference value $T_0$ calculated in such a manner as described above, for example, in such a manner as illustrated in the flow chart of a subroutine for calculation of Hiro01 of FIG. 7.

Referring to FIG. 7, the control flow is started in response to switching on of the ignition switch, and first, as initialization, the fatigue determination value Hiro01 and the value $R_T$ are reset to 0; the count value n' to 50; the $R_0$ flag $R_0$Flg to 0; and the determination value sampling flag RFlg to 1.

Then, it is determined whether or not the flag $T_0$Flg is equal to 1 (step a2), and if the flag $T_0$Flg is equal to 1, that is, during sampling for calculation of the reference value $T_0$, the present control (calculation) is not executed. If the flag $T_0$Flg is not equal to 1, that is, after completion of sampling for calculation of the reference value $T_0$, the control sequence advances to step a3, at which the reference value $T_0$ is read in.

Then, it is determined whether or not the vehicle speed V is equal to or higher than a predetermined value (for example, 40 km/h) (step a4), and then it is determined whether or not the magnitude that of the steering angle is equal to or larger than a predetermined value (for example, 30 deg) (step a5).

Either when the vehicle speed is not equal to or higher than the corresponding predetermined value when the magnitude |ha| of the steering angle equal to or larger than the corresponding predetermined value, the present calculation is not executed, but when the vehicle speed is equal to or higher than the the corresponding predetermined value and the magnitude |ha| of the steering angle is equal to or larger than the corresponding predetermined value, the control sequence advances to step a6, at which the value R (=ha'/ha) of the steering angular velocity ha' (=dha/dt) at the steering angle ha is calculated.

Further at step a7, the present value R is added to the value $R_T$ of the steering angle ha' at the steering angle ha, which has been calculated and stored in the last control cycle, to obtain a new value $R_T$. Then at step a8, the count value n' is decremented by one.

Subsequently at step a9, it is determined whether or not the count value n' is equal to 0, and if the count value n' is not equal to 0, that is, if 50 data samples for the value R (=ha'/ha) have not been added, the calculation cycle is ended.

On the other hand, when the count value n' is equal to 0 at step a9, that is, when 50 data samples for the value R (=ha'/ha) have been added, the control sequence now advances from step a9 to step a10, at which the count value n' is re-set to 50.

Then at step a11, it is determined whether or not the $R_0$ flag $R_0$Flg is equal to 1. When this step is passed for the first time after calculation of the fatigue determination value Hiro01 is started, since the $R_0$ flag $R_0$Flg is not equal to 1, the control sequence advances to step a12, at which the value $R_0$ is set to $T_0$, whereafter the control sequence advances to step a13.

At step 13, it is determined whether or not the determination value sampling flag RFlg is equal to In this instance, since the determination value sampling flag RFlg is set to 1 at an initial stage, the control sequence advances to step a14, at which an average value obtained by dividing the value $R_T$ by 50 is placed into the value $R_1$, and then to step a15, at which the determination value sampling flag RFlg is reset to 0.

The control sequence then advances to step a16, at which an average value (fatigue data) RR (=$(R_1+R_0)/2$) between the value $R_1$ and the value $R_0$ is calculated.

Then at step a17, the fatigue determination value Hiro01 is calculated as a difference (=RR−$T_0$) between the value RR of the fatigue data and the reference value $T_0$.

Then, when next 50 sampling operations are completed, since the determination sampling flag RFlg is now equal to 0, the control sequence advances by way states a9, a10, a11 and a12 to step a13 and thus advances from step a13 to step a18.

At step a18, an average value obtained by dividing the value $R_T$ by 50 is set as the value $R_0$, and then at step a19, the determination value sampling flag RFlg is set to 1. Then at step a20, the $R_0$ flag $R_0$Flg is set to 1, and thereafter the control sequence advances to step a16.

In this instance, at step a16, the value RR $(=(R_1+R_0)/2)$ of the fatigue data is calculated from the value $R_1$ stored since the preceding control cycle and the value $R_0$ set at step a18 described above.

Then, similarly as in the processing in the preceding control cycle, the fatigue determination value Hiro01 is calculated as a difference $(=RR-T_0)$ between the fatigue data RR and the reference value $T_0$ at step a17.

In this manner, the fatigue determination value Hiro01 is always calculated, after averaging between the latest data values $R_1$ and $R_0$, as latest and stable data.

Setting of an adaptation based on such fatigue determination value Hiro01 is performed such that, when the fatigue determination value Hiro01 exceeds a predetermined value as shown in FIG. 2, it is determined that the driver is in a fatigued condition and the adaptation is increased in response to the fatigue determination value Hiro01 (the degree of fatigue of driver). The aimed assist amount is set so that the assist decreasing control amount may be set to S (small), that is, the steering assist amount may increase, in response to the adaptation. Consequently, the steering force is reduced and the driver can steer easily when the driver is in a fatigued condition Meanwhile, if the lateral acceleration $G_Y$ rises to a certain level, the adaptation at which the assist decreasing control amount is set to S (small) decreases as the lateral acceleration $G_Y$ increases. Accordingly, for example, when the steering angle is large and the lateral acceleration is high, an increase of the steering assist amount is suppressed. Consequently, an unstable steering operation can be prevented, and reduction in operating force when the driver is in fatigued condition can be realized while maintaining steering information.

Figure 4:
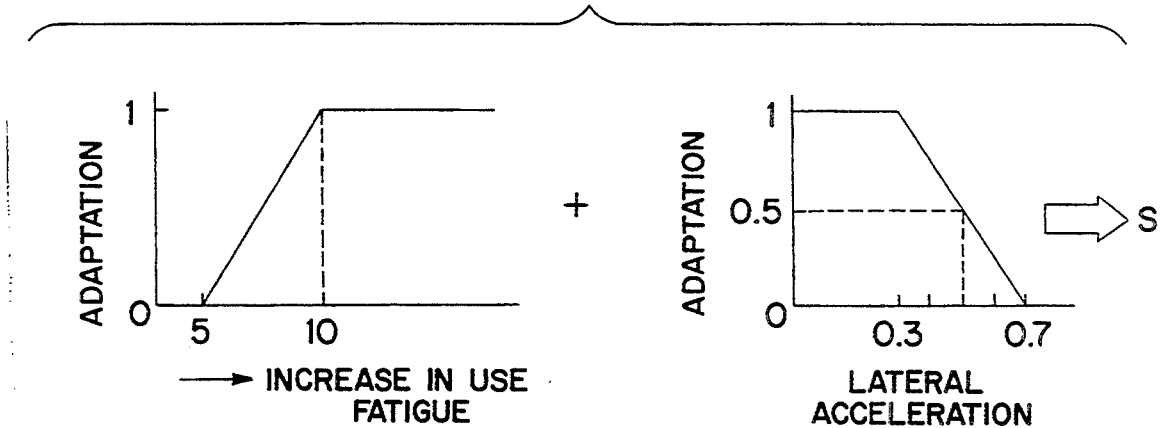
FIG. 4 is a diagram illustrating an example of calculation of an adaptation for use for fuzzy control of the electronically controlled steering apparatus of the fuzzy control type of FIG. 1.
Figure 5:
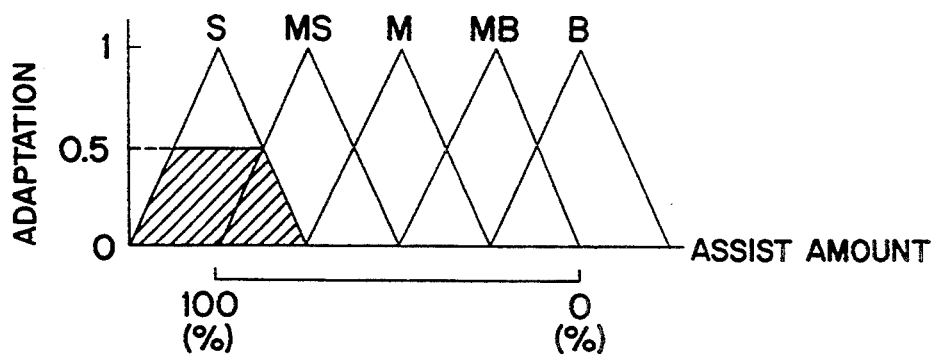
FIG. 5 is a diagram illustrating a specific example of trapezoidal set with which a power steering assist amount is calculated from an adaptation for use for fuzzy control of the electronically controlled steering apparatus of the fuzzy control type of FIG. 1.

For example, then the fatigue determination value Hiro01 is 10 and the lateral acceleration GY 0.5 G as shown in FIG. 4, the adaptations of them are 1 and 0.5 as shown in FIG. 5, respectively. Here, the lower one of the adaptations, that is, 0.5, is adopted so that the assist decreasing control amount is S (small). Then, the adaptation thus adopted is composed with another aimed assist amount, which is determined from the different input conditions, using the method of elastic center or some other suitable method to set a final aimed assist amount.

It is to be noted that, while the electronically controlled power steering apparatus of the fuzzy control type described above can be applied to a rear wheel driving vehicle (FR vehicle), it is very effective if it is applied to a front wheel driving vehicle (FF vehicle) with which it is comparatively difficult to obtain a desired steering force characteristic.

It is to be further noted that the control system of the present apparatus can be applied not only to a hydraulic power steering apparatus but also an electrically operated power steering apparatus.

What is claimed is:

1. In an electronically controlled power steering apparatus which comprises aimed assist amount setting means for setting an aimed assist amount for controlling a steering assist amount of a vehicle in response to the aimed assist amount set by said aimed assist amount setting means, the improvement comprising fatigue detection means for detecting a degree of fatigue of a driver of the vehicle according to a hysteresis of an operation condition of a steering wheel; and lateral acceleration detection means for detecting a lateral acceleration acting upon the vehicle;

wherein said aimed assist amount setting means sets the aimed assist amount so that the steering assist amount is increased as the degree of fatigue increases and the steering assist amount is decreased as the lateral acceleration increases.

2. The electronically controlled power steering apparatus according to claim 1, further comprising:

steering angle detection means for detecting a steering angle; and steering angular velocity detection means for detecting a steering angular velocity;

wherein said fatigue detection means calculates a ratio of the steering angular velocity to the steering angle and sets the degree of fatigue based on a hysteresis of the ratio.

3. The electronically controlled power steering apparatus according to claim 2, wherein said fatigue detection means includes means for calculating a reference value by averaging values of the steering angular velocity at a steering angle for a predetermined number of steering operation at an initial stage of driving of the vehicle, means for calculating an additional value by averaging values of the steering angular velocity at the steering angle for the predetermined number of steering operations at a subsequent driving time, and means for calculating fatigue data by averaging said reference value and said additional value.

4. The electronically controlled power steering apparatus according to claim 3, wherein said fatigue detection means further includes means for calculating the degree of fatigue by subtracting the fatigue data from the reference value.

5. The electronically controlled power steering apparatus according to claim 3, further comprising means for calculating the reference value each time an ignition switch of the vehicle is switched from an off state to an on state.

6. The electronically controlled power steering apparatus according to claim 3, further comprising vehicle speed detecting means for detecting a speed of the vehicle, the reference value being calculated by sampling values of the steering angular velocity at a steering angle for a predetermined number of steering operations only when the vehicle speed is not less than a predetermined value and an absolute value of the steering angle is not less than a predetermined value.

7. The electronically controlled power steering apparatus according to claim 3, further comprising vehicle speed detecting means for detecting a speed of the vehicle, the fatigue data being calculated by sampling values of the steering angular velocity at a steering angle for a predetermined number of steering operations only when the vehicle speed is not less than a predetermined value and an absolute value of the steering angle is not less than a predetermined value.

8. The electronically controlled power steering apparatus according to claim 1, wherein said aimed assist amount setting means sets the aimed assist amount in accordance with at least one of a vehicle speed and a steering angle as an input condition in addition to the degree of fatigue and the lateral acceleration.

9. In a vehicle equipped with means for steering and means for providing power assist for steering the vehicle, a method comprising varying the power assist amount based upon a factor representative of driver fatigue, wherein said factor is calculated based upon driver-induced movements of the means for steering the vehicle, the improvement comprising providing fatigue detection means for detecting a degree of fatigue of a driver of the vehicle according to a hysteresis of an operation condition of a steering wheel; and providing lateral acceleration detection means for detecting a lateral acceleration acting upon the vehicle;

wherein said aimed assist amount setting means sets the aimed assist amount so that the steering assist amount is increased as the degree of fatigue increases and the steering assist amount is decreased as the lateral acceleration increases.

10. In an electronically controlled power steering apparatus which comprises aimed assist amount setting means for setting an aimed assist amount and controlling a steering assist amount of a vehicle in response to the aimed assist amount set by said aimed assist amount setting means, the improvement comprising:

fatigue detection means for detecting a degree of fatigue of a driver of the vehicle according to a hysteresis of an operation condition of a steering wheel; and lateral acceleration detection means for detecting a lateral acceleration acting upon the vehicle; wherein said aimed assist amount setting means sets the aimed assist amount in accordance with a fuzzy logic rule so that the steering assist amount is increased when the degree of fatigue is high and the lateral acceleration is small.

11. The electronically controlled power steering apparatus according to claim 10, wherein said aimed assist amount setting means uses a membership function for for evaluating a high value of the degree of fatigue and a membership function for evaluating a low value of the lateral acceleration so that the aimed assist amount is set in accordance with the smaller value of adaptation output from both membership functions.

12. The electronically controlled power steering apparatus according to claim 11, wherein the membership function for evaluating the lateral acceleration is set so that the output adaptation is set to 0 in a region where the degree of fatigue is smaller than a predetermined value.

13. The electronically controlled power steering apparatus according to claim 11, wherein the membership function for evaluating the lateral acceleration is set so that the output adaptation is set to 0 in a region where the lateral acceleration is greater than a predetermined value.

14. The electronically controlled power steering apparatus according to claim 10, wherein said aimed assist amount setting means uses another fuzzy logic rule, in addition to said fuzzy logic rule, using at least one of the vehicle speed and the steering angle.

15. In a vehicle equipped with means for steering and means for providing power assist for steering the vehicle, a method comprising varying the amount of power assist based upon a calculation of driver fatigue, said method comprising evaluating driver-induced movements of the means for steering the vehicle at a first time during driving;

evaluating said driving-induced movements of the means for steering the vehicle at a second time during driving; and calculating a fatigue factor representative of driver fatigue according to a hysteresis of an operation condition of a steering wheel based upon one or more differences in said driver-induced movements from said first time to said second time; and varying the power assist amount based upon said fatigue factor.

16. The method as in claim 15, further comprising increasing the power assist amount as said fatigue factor increases.

17. The method as in claim 16, further comprising maintaining the power assist amount constant regardless of increases in the fatigue factor after the fatigue factor reaches a predetermined value.

18. The method as in claim 15, wherein said evaluating is performed only when said movements are not less than a predetermined magnitude steering the vehicle at a second time during driving; and calculating a fatigue factor representative of driver fatigue according to a hysteresis of an operation condition of a steering wheel based upon one or more differences in said driver-induced movements from said first time to said second time; and varying the power assist amount based upon said fatigue factor.

19. The method as in claim 15, further comprising wherein the step of calculating a fatigue factor comprises:

detecting a steering angle of the vehicle and a first steering angular velocity at said angle at said first time to obtain a first value;

detecting the steering angle of the vehicle and a second steering angular velocity at said second time to obtain a second value; and averaging said first and second values to obtain a fatigue data value.

20. The method as in claim 19, wherein said first time is a time following a turning-on an ignition switch of the vehicle, and said first value is a reference value.

21. The method as in claim 20, further comprising subtracting said reference value from said fatigue data value to obtain said fatigue factor.

22. The method as in claim 21, further comprising detecting the steering angle of the vehicle and a third steering angular velocity of the vehicle at a third time to obtain a third value;

averaging said second and third values to obtain a further fatigue data value;

subtracting said reference value from said further fatigue data value to obtain a further fatigue factor; and varying the assist amount based upon said further fatigue factor.

23. The method as in claim 22, wherein said detecting the steering angle and the steering angular velocity said third time comprises sampling the angle and angular velocity a plurality of times and determining an average, thereby determining said third value.

24. The method as in claim 19, wherein said detecting the steering angle and the steering angular velocity at each of said first and second times comprises sampling the angle and angular velocity a plurality off times and determining an average each time, thereby determining said first and second values, respectively.

25. The method as in claim 19, wherein said detecting is performed only when vehicle speed is not less than a predetermined value.

26. The method as in claim 19, wherein said detecting is performed only when the steering angle is not less than a predetermined value.

27. The method as in claim 15, wherein said evaluating is performed only when vehicle speed is not less than a predetermined value.

\* \* \* \* \*